(12) United States Patent
Wong et al.

(10) Patent No.: US 6,320,853 B1
(45) Date of Patent: Nov. 20, 2001

(54) METHOD OF PHASE RECOVERY IN CELLULAR COMMUNICATION SYSTEMS

(75) Inventors: Piu Bill Wong, Monte Serno; Shimon B. Scherzer, Sunnyvale, both of CA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

(21) Appl. No.: 09/672,175

(22) Filed: Sep. 27, 2000

Related U.S. Application Data

(60) Provisional application No. 60/156,272, filed on Sep. 27, 1999.

(51) Int. Cl.$^7$ .................................................. H04Q 7/32
(52) U.S. Cl. ........................................ 370/328; 455/277.1
(58) Field of Search .................................. 370/328, 335, 370/342, 480, 491, 516; 455/422, 276.1, 277.1, 277.2, 278.1

(56) References Cited

U.S. PATENT DOCUMENTS

| | | | |
|---|---|---|---|
| 5,621,752 | * 4/1997 | Antonio et al. ...................... | 375/200 |
| 5,634,199 | 5/1997 | Gerlach et al. ........................ | 455/63 |
| 5,940,742 | 8/1999 | Dent ..................................... | 455/31.3 |
| 5,953,325 | * 9/1999 | Willars ................................. | 370/335 |
| 5,966,094 | * 10/1999 | Ward et al. ........................... | 342/373 |
| 5,966,670 | * 10/1999 | Keskitalo et al. .................... | 455/562 |
| 5,991,332 | 11/1999 | Lomp et al. .......................... | 375/206 |
| 6,009,089 | 12/1999 | Huang et al. ......................... | 370/342 |
| 6,108,565 | 8/2000 | Scherzer ............................... | 455/562 |
| 6,212,406 | * 4/2001 | Keskitalo et al. .................... | 455/562 |

\* cited by examiner

*Primary Examiner*—Min Jung
(74) *Attorney, Agent, or Firm*—Fulbright & Jaworski L.L.P.

(57) ABSTRACT

This invention provides a CDMA (IS-95) cellular communication system, in which a base station transmits a common broadcast pilot signal through a sector wide beam and traffic signals through narrower adaptive spatial beams by way of an adaptive antenna array. The present invention further provides methods of recovering the phase mismatch between the pilot and traffic signals received at a mobile station, thereby providing for coherent demodulation. By implementing the phase-recovery process at individual mobile stations, the present invention enables the base station to transmit the traffic signals with optimal power gain and minimal interference.

38 Claims, 6 Drawing Sheets

METHOD OF PHASE RECOVERY IN CELLULAR COMMUNICATION SYSTEMS

CROSS-REFERENCES TO RELATED APPLICATIONS

This application claims the benefit of U.S. Provisional Application No. 60/156,272, filed Sep. 27, 1999, which is incorporated herein by reference for all purposes.

FIELD OF THE INVENTION

The present invention relates to wireless communication systems. More specifically, the invention relates to methods of phase recovery between a common pilot signal and dedicated traffic signals at a mobile station. This invention pertains to applications in which a base station uses a sector wide beam for transmitting the pilot signals and adaptive spatial beams with the highest possible gain for transmitting the traffic signals.

BACKGROUND

As wireless communications rapidly spread and promise to deliver voice and data to every walk of modern life, a great deal of effort is devoted to enhance the capacity and performance of wireless communication networks.

US IS-95 CDMA cellular standard, the second US digital cellular standard based on CDMA (code division multiple access) technology, is designed to deliver a very high capacity by way of spread-spectrum signal techniques. In IS-95, the downlink (or forward link) channel structure consists of the transmission of up to 64 simultaneous, distinct channels with varying functions that are orthogonally multiplexed onto a common RF carrier. One of these channels is a high-power pilot signal that is transmitted continuously as a coherent phase reference of reception of a radio frequency (RF) carrier modulated by information. Another of these channels is a continuously transmitted synchronization channel that is used to convey system information to all users in the cell. Up to seven paging channels are used to signal incoming calls to mobiles in the cell, and to convey channel assignments and other signaling messages to individual mobiles. The remainder of the channels is designated as traffic channels, each transmitting voice and data to an individual mobile user.

At the mobile station, the common broadcast pilot signal is used to recover the phase of the RF carrier in order to coherently demodulate the received traffic signals. This approach would require that both the pilot and traffic signals received at the mobile station have the same phase as the RF carrier. This phase-matching requirement is easy to accomplish if the pilot signal and the traffic signals are transmitted through the same sector beam, often through a single antenna, as illustrated in FIG. 1A. In FIG. 1A, an antenna 101 at a base station 100 transmits a sector beam carrying, among other things, a pilot signal 103 and a traffic signal designated 104 to a mobile station 102.

U.S. Pat. No. 6,108,565 describes a system and method for enhancing CDMA communication capacity. In particular, it provides a base station with an adaptive antenna array system, such that a common pilot signal is transmitted through a sector wide beam and one or more traffic signals are transmitted through a narrower adaptive spatial beam, as illustrated in FIG. 1B. In FIG. 1B, an adaptive antenna array system 111 at a base station 110 transmits a sector wide beam carrying a common pilot signal 113 and a narrower adaptive spatial beam carrying a traffic signal 114 designated to a mobile station 112 along with other traffic signals.

The aforementioned adaptive spatial beams render important advantages of providing higher effective radiated power to the desired user and reducing cross-talk interference to other users. However, this novel approach requires that the downlink traffic beam be phase matched with the sector pilot beam, in order to carry out coherent demodulation at individual IS-95 mobile stations. Moreover, care must be taken to ensure that the phase-matching process is achieved not at the expense of compromising the gain of the traffic beam and hence the gain of the downlink system capacity.

There exists a need, therefore, for a simple and effective method for matching the phases of the common pilot beam and the dedicated traffic beams without compromising the downlink system capacity.

OBJECTS AND ADVANTAGES

Accordingly it is a principal object of the present invention to provide methods for recovering the phase mismatch between a common pilot signal and dedicated traffic signals at a mobile station. A significant advantage of the present invention is that it enables the base station to advantageously use a sector beam for transmitting the common broadcast pilot signal and adaptive spatial beams for transmitting the dedicated traffic signals, thereby effectively enhancing the gain of the traffic beams and hence the gain of the downlink system capacity, and reducing the cross-talk interference.

These and other objects and advantages will become apparent from the following description and accompanying drawings.

SUMMARY OF THE INVENTION

This invention provides a CDMA (IS-95) cellular communication system, in which a base station transmits a common broadcast pilot signal through a sector wide beam and traffic signals through narrower adaptive spatial beams by way of an adaptive antenna array system. The present invention further provides methods of recovering the phase mismatch between the common pilot signal and the traffic signals received at a mobile station, thereby providing for coherent demodulation.

In an exemplary embodiment of the present invention, the mobile station is implemented with a novel downlink demodulator, which is configured to construct in-phase and quadrature-phase signals from the received pilot and traffic signals, such that the in-phase and quadrature-phase signals are respectively proportional to cosine and sine functions of the phase mismatch between the common pilot signal and the traffic signals. The demodulator further allows the phase mismatch itself to be extracted and averaged. Moreover, the demodulator uses the thus-constructed in-phase and quadrature-phase signals to produce an output signal that is independent of the phase mismatch, thereby eliminating the effects of the carrier phase in the demodulation process.

By carrying out the aforementioned phase recovery at the mobile station, the present invention eliminates the necessity for the pilot-traffic phase matching process at the base station, thereby enabling the base station to form the traffic beams with maximum power gain and minimum interference.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 2A:
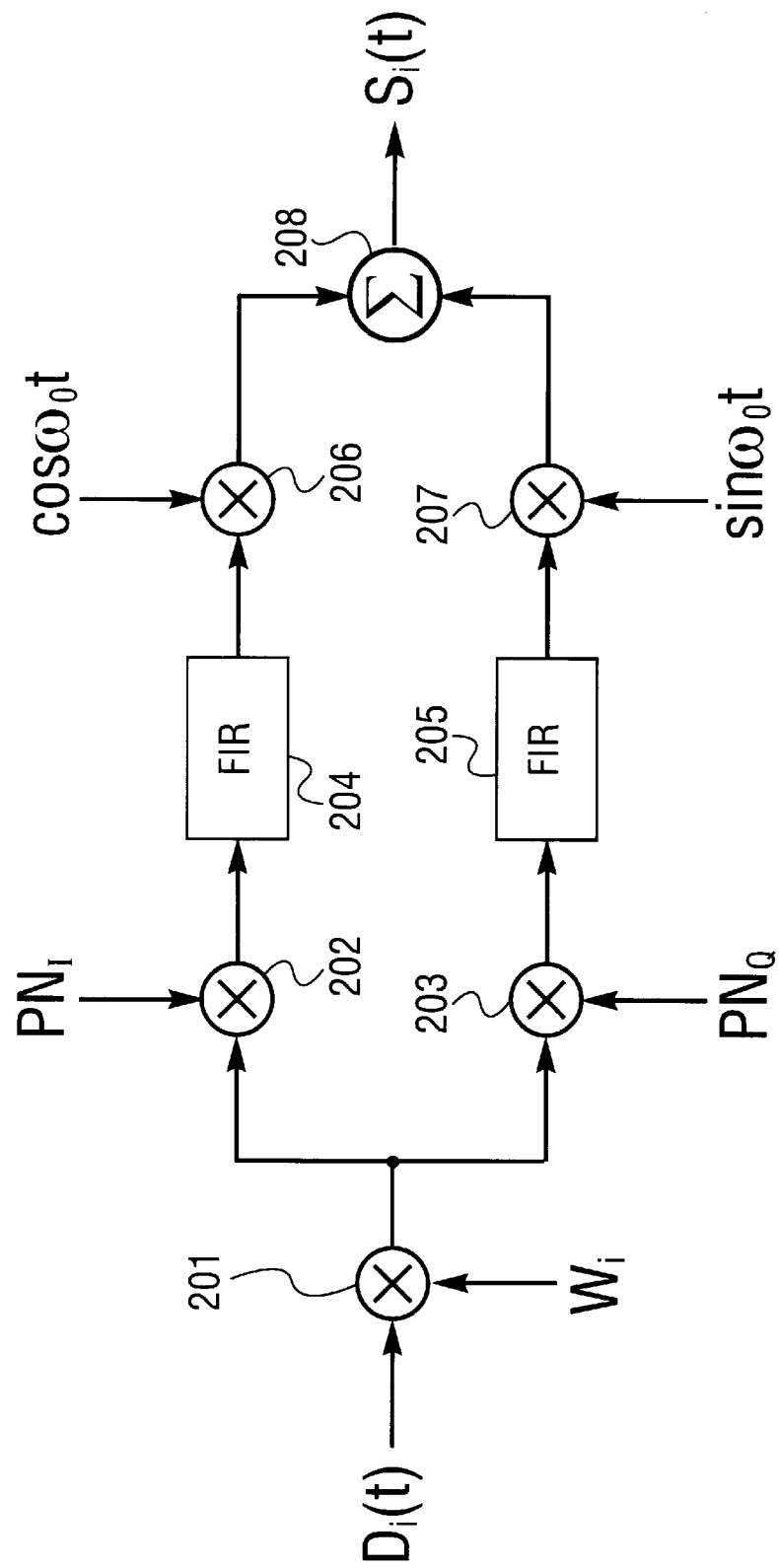
FIGS. 2A–2C show two typical IS-95 downlink modulators and a mobile station downlink demodulator according to the prior art.
Figure 2B:
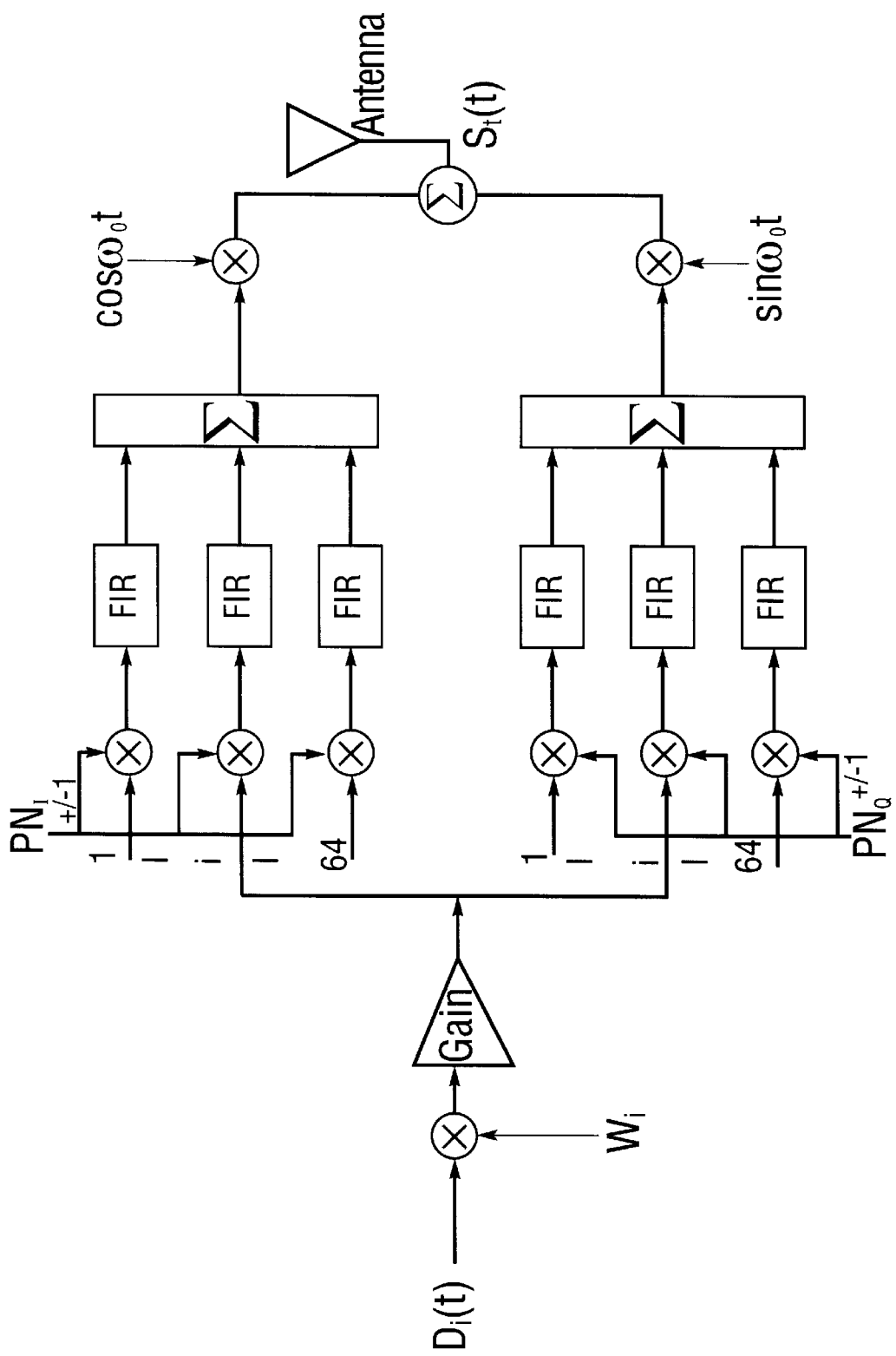
Figure 2C:
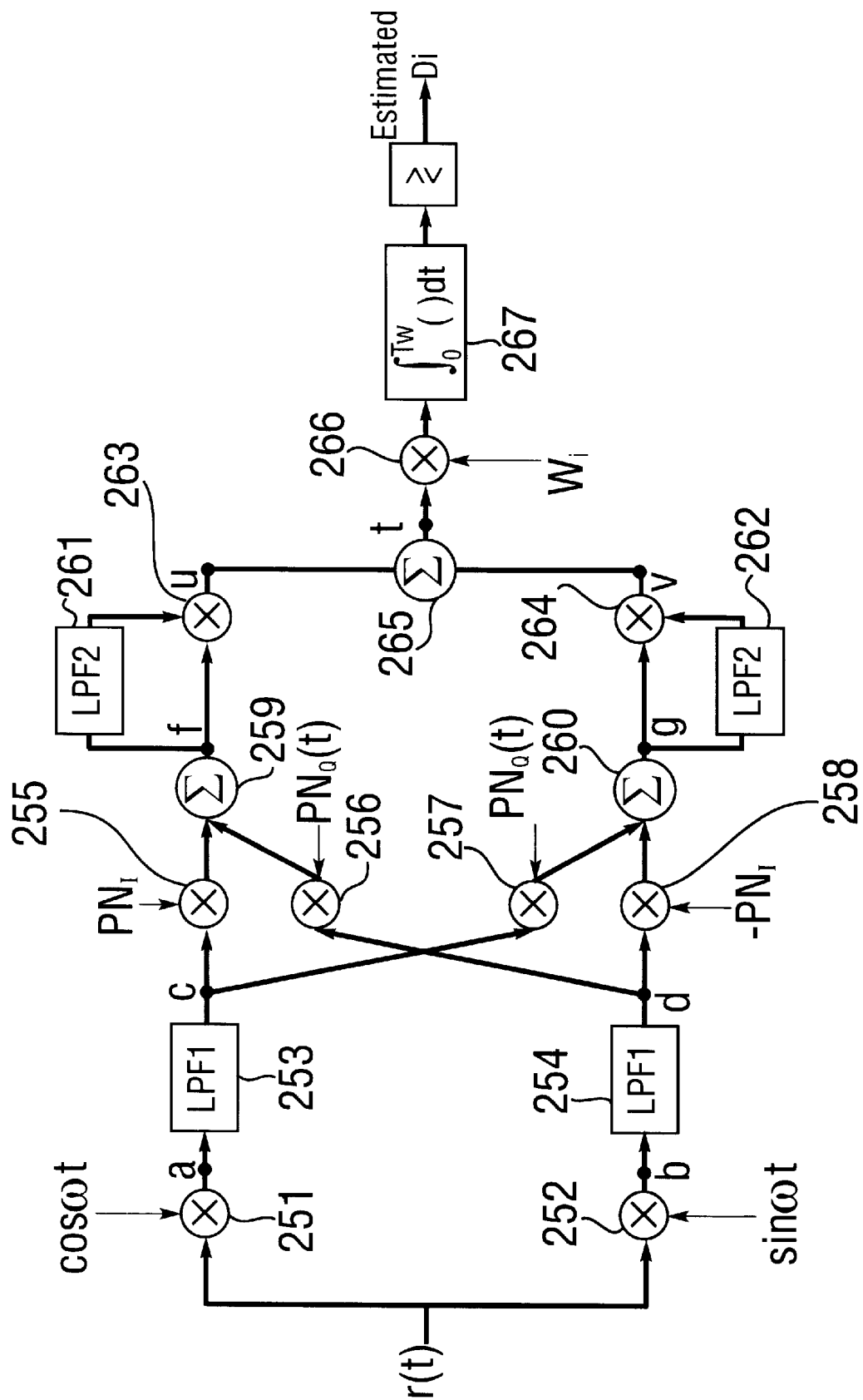

For the purpose of elucidating the principle and utility of the present invention, two IS-95 downlink modulators and a mobile station downlink demodulator according to the prior art are shown in FIGS. 2A–2C respectively, and described as follows.

In IS-95, all the downlink channels (pilot, sync, paging, and traffic) employ binary phase-shift keying (BPSK) modulation for information symbol transmission. The BPSK signal is then spread by complex pseudo-random noise sequences. FIG. 2A shows a typical IS-95 downlink modulator for Channel i, where i is between 1 and 64, representing any one of 64 possible downlink channels. Data waveform $D_i$, scrambled by the long pseudo-random noise (PN) sequence and encoded with the transmitting data, is multiplied by Walsh function $W_i$ at multiplier 201. $W_i$ is the $i^{th}$ Walsh sequence in Walsh functions of "order 64", an orthogonal set of "sub-carrier" digital waveforms extensively used in the IS-95 system. The resultant product is then separately multiplied by $PN_I$ at multiplier 202 in the upper branch, and by $PN_Q$ at multiplier 203 in the lower branch. $PN_I$ and $PN_Q$ are two distinct maximal length short ±1 pseudo-random noise (PN) sequences. The PN-multiplied products in the upper and lower branches are then shaped by finite-impulse-response (FIR) pulse shaping filters 204, 205 respectively, wherein the FIR filters are designed to control the bandwidth of each waveform and therefore the spectrum of the radiated power for minimal adjacent-frequency interference. The pulse-shaped waveforms are subsequently modulated by the in-phase carrier $\cos \omega_o t$ at multiplier 206 and by the quadrature-phase carrier $\sin \omega_o t$ at multiplier 207 respectively. The in-phase carrier modulated waveform thus constitutes the I-channel, and the quadrature-phase carrier modulated waveform thus constitutes the Q-channel, which are then summed at summing-operator 208. The resultant signal $s_i(t)$ to be transmitted can be expressed as, $$s_i(t) = I_i(t)\cos\omega_o t + Q_i(t)\sin\omega_o t = (PN_I W_i D_i)\cos\omega_o t + (PN_Q W_i D_i)\sin\omega_o t \quad (1)$$

It should be noted that the resultant quantity enclosed by each ( ) on the right hand of Eq. (1) is pulse-shaped. This notation will be ignored in the following analysis, for the sake of simplicity and clarity, since the effects of the pulse-shaping are immaterial to the result of this invention. Also note that the QPSK modulation in this case is made up of two independent BPSK modulations of the in-phase and quadrature-phase carriers, the so-called I-channel and Q-channel "information symbols". The summing of the I-channel and Q-channel symbols by way of summing-operator 208 provides a convenient and economic way of transmitting these waveforms by means of a single carrier. As such, the QPSK signal $s_i(t)$ is translated to a higher frequency carrier and radiated into the air, so as to be received by a designated mobile station.

In the above embodiment, when i denotes the pilot channel, the corresponding data waveform is the constant 1, indicating that the pilot channel does not carry information. This is, $D_{pilot}=1$. As a result, the pilot channel is easily acquired by the mobile station receiver because it has no data modulation—only the quadrature PN codes. The pilot channel is used primarily as a coherent phase reference for demodulating the other channels. Because the pilot channel is necessary for crucial timing information, it is transmitted at a higher power level than the other channels.

FIG. 2B show a typical IS-95 downlink Walsh function orthogonal multiplexing configuration for up to 64 channels, each with the processing depicted in FIG. 2A. The transmitted downlink waveform can be written as, $$s_t(t) = I_t(t)\cos\omega_o t + Q_t(t)\sin\omega_o t \quad (2)$$

where $I_t(t)$ and $Q_t(t)$ are the in-phase and quadrature-phase waveforms respectively, given by $$I_t(t) = \sum_{i=0}^{63} (PN_I A_{oi} W_i D_i) \quad (3)$$

and $$Q_t(t) = \sum_{i=0}^{63} (PN_Q A_{oi} W_i D_i) \quad (4)$$

where $A_{oi}$ (i=1 to 64) are digitally controlled channel transmitter amplitudes, which can be different for each channel. Note that a unique Walsh function is assigned to each channel, so that upon reception at their respective mobile stations the traffic channels can be distinguished (demultiplexed) based on the orthogonality of the assigned Walsh functions, as demonstrated below.

FIG. 2C shows a prior art IS-95 mobile station downlink demodulator for one particular time finger. The same circuitry can be used for demodulating other time fingers. The received waveform r(t) at a particular mobile station using channel i can be expressed as $$r(t) = s_r(t) + n(t) \quad (5)$$

where $$s_r(t) = I_r(t)\cos\omega_o t + Q_r(t)\sin\omega_o t \quad (6)$$

with $$I_r(t) = \sum_{i=0}^{63} (PN_I A_i W_i D_i) \quad (7)$$

and $$Q_r(t) = \sum_{i=0}^{63} (PN_Q A_i W_i D_i) \quad (8)$$

where $A_i$ (i=1 to 64) denote the received channel amplitudes. n(t) in Eq.(5) represents uncorrelated noise waveforms, and will be ignored in the following analysis for the sake of simplicity and clarity, for it is inconsequential to the scope of the present invention.

In the demodulator of FIG. 2C, r(t) is fed to multiplier 251 in the upper branch and to multiplier 252 in the lower branch, where it is multiplied by cos ωt and sin ωt respectively so as to extract the in-phase and quadrature decision variables through coherent multiplication of the received waveform with I-channel and Q-channel carriers. ω is the demodulation frequency used by the mobile station, which may not be the same as the modulation frequency $\omega_o$ employed by the base station. Consequently, the waveforms at points a, b in the upper and lower branches respectively are $$r_a(t) = I_r(t)\cos(\omega_o t + \delta)\cos \omega t + Q_r(t)\sin(\omega_o t + \delta)\cos \omega t \quad (9)$$

$$r_b(t) = I_r(t)\cos(\omega_o t + \delta)\sin \omega t + Q_r(t)\sin(\omega_o t + \delta)\sin \omega t \quad (10)$$

where δ denotes an additional phase change each downlink channel may incur from traversing between the base station and the mobile station. $r_a(t)$ and $r_b(t)$ then pass through two low-pass filters (LPF1) 253, 254 respectively. Rewriting Eqs. (9) and (10) by way of the trigonometric identities:

$$\cos\theta_1\cos\theta_2 = \tfrac{1}{2}[\cos(\theta_1-\theta_2)+\cos(\theta_1+\theta_2)] \quad (11)$$

$$\sin\theta_1\sin\theta_2 = \tfrac{1}{2}[\cos(\theta_1-\theta_2)-\cos(\theta_1+\theta_2)] \quad (12)$$

$$\cos\theta_1\sin\theta_2 = \tfrac{1}{2}[\sin(\theta_1+\theta_2)-\sin(\theta_1-\theta_2)] \quad (13)$$

and $$\sin\theta_1\cos\theta_2 = \tfrac{1}{2}[\sin(\theta_1-\theta_2)+\sin(\theta_1+\theta_2)] \quad (14)$$

and neglecting those terms involving cosine and sine of $(\omega_o t+\omega t+\delta)$ upon filtering, the resultant waveforms at points c, d in the upper and lower branches respectively are $$r_c(t) = \tfrac{1}{2}I_r(t)\cos\phi + \tfrac{1}{2}Q_r(t)\sin\phi \quad (15)$$

and $$r_d(t) = \tfrac{1}{2}Q_r(t)\cos\phi - \tfrac{1}{2}I_r(t)\sin\phi \quad (16)$$

where $\phi = \omega_o t - \omega t + \delta$. Note that φ is the same for all the downlink channels, since they are carried by the same carrier beam in a typical IS-95 system prevalent in the art. $r_c(t)$ is then separately multiplied by $PN_I$ at multiplier 255 and by $PN_Q$ at multiplier 257. $r_d(t)$ is separately multiplied by $-PN_I$ at multiplier 258 and by $PN_Q$ at multiplier 256. The resultant waveform at point f following summing-operator 259 in the upper branch is given by $$r_f(t) = PN_I \times r_c(t) + PN_Q \times r_d(t) \quad (17)$$

Similarly, the resultant waveform at point g following summing-operator 260 in the lower branch is given by $$r_g(t) = PN_Q \times r_c(t) - PN_I \times r_d(t) \quad (18)$$

$r_f(t)$ is then fed to a low-pass filter (LPF2) 261 and also directly to multiplier 263. Note that LPF2 is different from LPF1, and is designed to perform the filtering (or averaging) on the basis of the pilot channel signal in that only the pilot channel gets averaged (analogous to selecting a particular Fourier component from a function). Further note that since $(PN_Q)(PN_I)=\pm 1$, any term involving such a product in Eq. (17) effectively constitutes a high frequency term and is consequently averaged out by LPF2. (For the same reason, any term herein involving $(PN_Q)(PN_I)$ in the following analysis will be neglected, since it will be eventually averaged out, as shown below.) Hence, the LPF2-filtered waveform exiting low-pass filter 261 is $$(r_f)_{LPF2} = \tfrac{1}{2}(PN_I I_{ro} + PN_Q Q_{ro})(\cos\phi)_{LPF2} \approx \tfrac{1}{2}(PN_I I_{ro} + PN_Q Q_{ro}) \cos\bar{\phi} \quad (19)$$

where an approximation, $(\cos\phi)_{LPF2} \approx \cos\bar{\phi}$, is taken (this is particularly the case if the noise level is low), and $\bar{\phi}$ is herein termed the averaged phase change. $I_{ro}$ and $Q_{ro}$ in the above equation are the I-component and Q-component corresponding to the pilot signal, given by $$I_{ro} = PN_I A_o W_o D_o \quad (20)$$

and $$Q_{ro} = PN_Q A_o W_o D_o \quad (21)$$

Note that channel 0 (i.e., i=0) is assigned to the pilot channel in this case, $W_o$ is the corresponding Walsh function, and $D_o=1$. $(r_f)_{LPF2}$ is subsequently fed to multiplier 263. Hence, the resultant waveform at point u in the upper branch is given by $$r_u(t) = (r_f)_{LPF2} \times r_f \quad (22)$$

$$= \left[\tfrac{1}{2}(PN_I I_{ro} + PN_Q Q_{ro})\cos\bar{\phi}\right] \times \left[\tfrac{1}{2}(PN_I I_r + PN_Q Q_r)\cos\phi\right]$$

$$= A_o W_o D_o \sum_{i=0}^{63} A_i W_i D_i \cos\bar{\phi}\cos\phi$$

where $(PN_I)^2 = (PN_Q)^2 = 1$ is utilized in the derivation. Likewise, $r_g(t)$ is fed to low-pass filter (LPF2) 262 and also directly to multiplier 264. The LPF2-filtered waveform exiting low-pass filter 262 is $$(r_g)_{LPF2} = \tfrac{1}{2}(PN_Q Q_{ro} + PN_I I_{ro})(\sin\phi)_{LPF2} \approx \tfrac{1}{2}(PN_Q Q_{ro} + PN_I I_{ro}) \sin\bar{\phi} \quad (23)$$

where $(\sin\phi)_{LPF2} \approx \sin\bar{\phi}$, and $I_{ro}$ and $Q_{ro}$ are given by Eqs. (20) and (21) respectively. $(r_g)_{LPF2}$ is subsequently fed to multiplier 264. Therefore, the resultant waveform at point v in the lower branch is $$r_v(t) = (r_g)_{LPF2} \times r_g \quad (24)$$

$$= \left[\tfrac{1}{2}(PN_Q Q_{ro} + PN_I I_{ro})\sin\bar{\phi}\right] \times \left[\tfrac{1}{2}(PN_Q Q_r + PN_I I_r)\sin\phi\right]$$

$$= A_o W_o D_o \sum_{i=0}^{63} A_i W_i D_i \sin\bar{\phi}\sin\phi$$

$r_u$ and $r_v$ are further summed at summing-operator 265, and the combined waveform at point t is given by $$r_t = r_u + r_v \quad (25)$$

$$= A_o W_o D_o \sum_{i=0}^{63} A_i W_i D_i (\cos\bar{\phi}\cos\phi + \sin\bar{\phi}\sin\phi)$$

$$= A_o W_o D_o \sum_{i=0}^{63} A_i W_i D_i \cos(\bar{\phi} - \phi)$$

where $(PN_I)^2 = (PN_Q)^2 = 1$ is also utilized in the derivation. Since φ is the same for all the downlink channels, hence $\bar{\phi} \approx \phi$, and it follows that $$r_t = A_o W_o D_o \sum_{i=0}^{63} A_i W_i D_i \quad (26)$$

$r_t$ is further multiplied by $W_i$ at multiplier 266, and the resultant product is integrated over the Walsh function period $T_w$ at integrator 267. Because of the orthogonality of the Walsh functions, the combined effect of the operations performed by multiplier 266 and integrator 267 is to extract the component associated with channel i in Eq. (26), which carries the desired data waveform $D_i$. An assembly of a Walsh-function multiplier followed an integrator, such as multiplier 266 and integrator 267, is herein termed a "Walsh-decomposition assembly" in this specification and appending claims.

The present invention pertains to a cellular communication system in which a base station employs an adaptive antenna array system to form different adaptive spatial beams (typical less than 120°) for downlink traffic signals designated to different mobile stations. All the mobile stations are sharing the same common pilot signal that is transmitted through a sector wide beam.

Figure 1A:
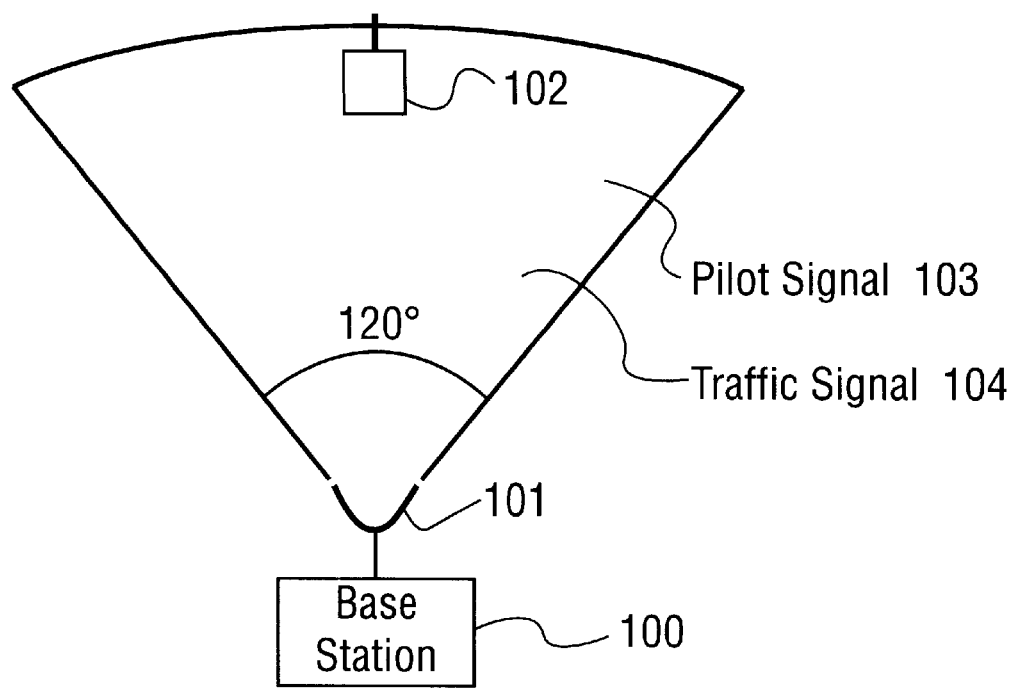
FIGS. 1A–1B provide exemplary illustrations of the pilot and traffic beam patterns in a prior art IS-95 system and in an adaptive beam forming system provided by U.S. Pat. No. 6,108,565.
Figure 1B:
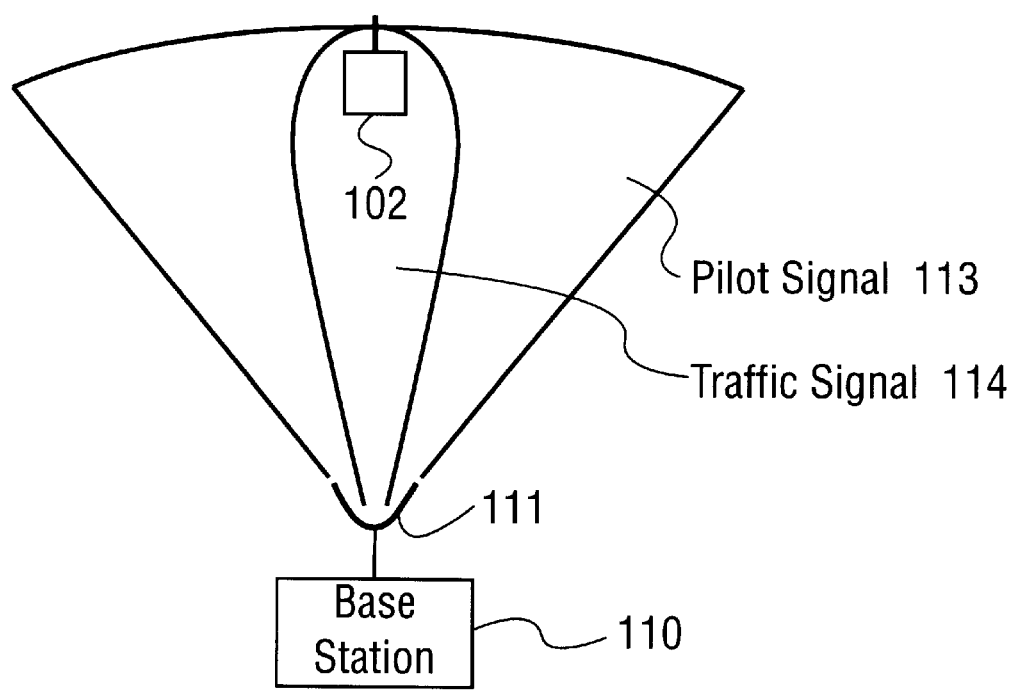
Figure 3A:
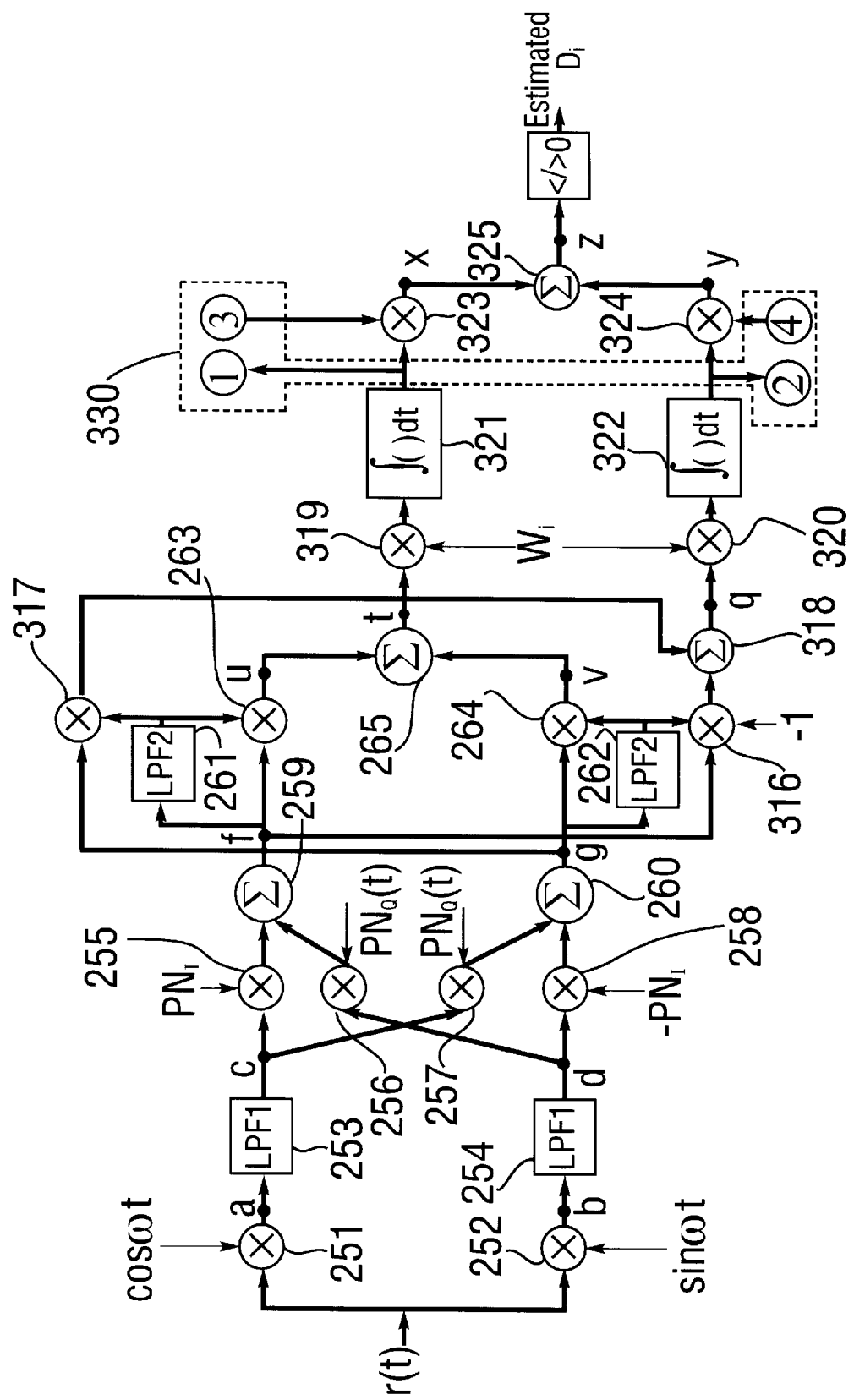
FIGS. 3A–3B depict an IS-95 mobile station downlink demodulator employing a novel circuitry for recovering the phase mismatch between the pilot and traffic signals, according to the present invention.

As a way of example, FIG. 3A depicts an exemplary embodiment of an IS-95 downlink demodulator according to the present invention, designed for—but not limited to—a cellular communication system in which a base station transmits a pilot signal in a sector wide beam and traffic signals in adaptive spatial beams, as illustrated in FIG. 1B. The inventive demodulator builds and improves upon the prior art mobile station downlink demodulator shown in FIG. 2C, hence shares some of the components of FIG. 2C, as indicated by those labeled with the same numbers. Following the description for FIG. 2C, the waveforms at points f, g respectively are given by $$r_f(t) = PN_I \times r_c(t) + PN_Q \times r_d(t) \quad (27)$$

and $$r_g(t) = PN_Q \times r_c(t) - PN_I \times r_d(t) \quad (28)$$

where $r_c(t)$ and $r_d(t)$ are given by Eqs. (15) and (16) respectively. Furthermore, the waveform at point t, $$r_t = A_o W_o D_o \sum_{i=0}^{63} A_i W_i D_i \cos(\overline{\phi} - \phi_i) \quad (29)$$

where $\overline{\phi}$ is the LPF2-averaged phase change of the pilot signal (in channel 0), and $\phi_i$ is the phase change associated with the traffic channel i, which may be different for each channel.

In the embodiment of FIG. 3A, $r_f(t)$ is further routed to multiplier 316 where it is multiplied by (−1) and by $(r_g)_{LPF2}$ from low-pass filter 262, and the resultant product is then fed to summing-operator 318. Similarly, $r_g(t)$ is further routed to multiplier 317 where it is multiplied by $(r_f)_{LPF2}$ from low-pass filter 261, and the resultant product is also fed to summing-operator 318. Thus, the combined waveform at point q is given by, $$r_q(t) = (-1) \times r_f \times (r_g)_{LPF2} + r_g \times (r_f)_{LPF2} \quad (30)$$

Substituting Eqs. (19), (23), (27) and (28) into the above equation, $r_q(t)$ can be expressed as $$r_q(t) = A_o W_o D_o \sum_{i=0}^{63} A_i W_i D_i (\sin \overline{\phi} \cos \phi_i - \sin \phi_i \cos \overline{\phi}) \quad (31)$$

which can be further simplified by way of Eqs. (13) and (14), $$r_q(t) = A_o W_o D_o \sum_{i=0}^{63} A_i W_i D_i \sin(\overline{\phi} - \phi_i) \quad (32)$$

$r_t(t)$ and $r_q(t)$ each are subsequently multiplied by $W_i$ at multipliers 319, 320, and the respective products then pass through integrators 321, 322, so as to extract the respective components associated with channel i in Eqs. (29) and (32). The resultant waveforms are, $$r_1 = A_o W_o D_o A_i D_i \cos(\overline{\phi} - \phi_i) = A_o W_o D_o A_i D_i \cos(\Delta \phi_i) \quad (33)$$

and $$r_2 = A_o W_o D_o A_i D_i \sin(\overline{\phi} - \phi_i) = A_o W_o D_o A_i D_i \sin(\Delta \phi_i) \quad (34)$$

where $\Delta \phi_i = \overline{\phi} - \phi_i$, the phase mismatch between the pilot signal and the traffic signal in channel i. $r_1$ and $r_2$, which are proportional to cosine and sine functions of the phase mismatch, are termed in-phase and quadrature-phase signals, hereinafter.

Figure 3B:
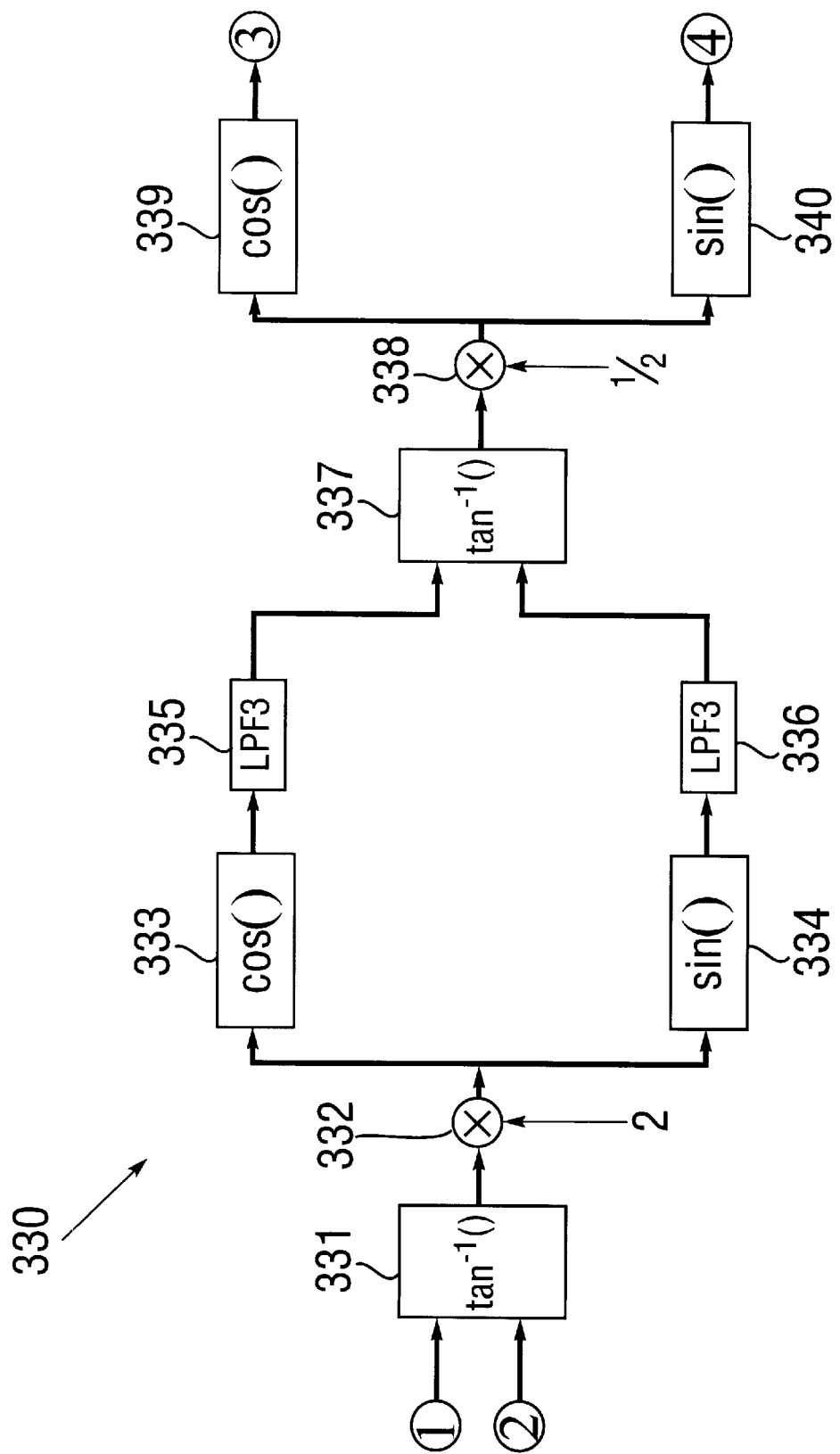

In the embodiment of FIG. 3A, $r_1$ and $r_2$ are further fed to a sub-circuitry 330 as indicated by a dashed box, in addition to passing directly onto multipliers 323, 324. The purpose of sub-circuitry 330, as depicted in greater detail in FIG. 3B, is to derive an averaged phase mismatch between the pilot signal and traffic signal. It works as follows. First of all, a four-quadrant-inverse-tangent, $$\tan^{-1}\left(\frac{r_2}{r_1}\right),$$

is performed at arctan-operator 331 to provide for $\Delta \phi_i$. The thus-obtained $\Delta \phi_i$ is then multiplied by 2 at multiplier 332. This is owing to the fact that in BPSK, the pilot signal is always sent in 0 phase, whereas a traffic signal is sent in either 0 or 180-degree phase. Hence, a multiplication of 2 by multiplier 332 renders the phase of the traffic signal 0 or 360-degree. $\cos(2\Delta \phi_i)$ and $\sin(2\Delta \phi_i)$ are then performed at cosine-operator 333 and sine-operator 334, and the resulting functions are averaged by low-pass filters (LPF3) 335, 336 respectively. Subsequently, a four-quadrant-inverse-tangent $\tan^{-1}()$ is performed again to yield $2\Delta \overline{\phi}$ at arctan-operator 337. The result is then multiplied by ½ by way of multiplier 338 (which effectively "undoes" the operation of multiplier 332) to provide for $\Delta \overline{\phi}$. Finally, $\cos(\Delta \overline{\phi})$ and $\sin(\Delta \overline{\phi})$ are taken by way of cosine-operator 339 and sine-operator 340, thereby providing $r_3$ and $r_4$ respectively.

Now referring back to the main diagram in FIG. 3A, $r_3$ and $r_4$ from sub-circuitry 330 shown in FIG. 3B are fed to multipliers 323, 324 respectively. As such, the resultant waveforms at points x and y respectively are $$r_x(t) = r_1 \times r_3 = A_o W_o D_o A_i D_i \cos(\Delta \phi_i) \cos(\Delta \overline{\phi}) \quad (35)$$

and $$r_y(t) = r_2 \times r_4 = A_o W_o D_o A_i D_i \sin(\Delta \phi_i) \sin(\Delta \overline{\phi}) \quad (36)$$

If $\Delta \phi_i$ does not deviate much from $\Delta \overline{\phi}$, then $$r_x(t) \approx A_o W_o D_o A_i D_i \cos^2(\Delta \overline{\phi}) \quad (37)$$

and $$r_y(t) \approx A_o W_o D_o A_i D_i \sin^2(\Delta \overline{\phi}) \quad (38)$$

Summing $r_x$ and $r_y$ by way of summing-operator 325, the output signal, i.e., the "decision variable", at point z is $$r_z(t)=r_x(t)+r_y(t)\approx A_o W_o D_o A_i D_i[\cos^2(\Delta\bar{\phi})+\sin^2(\Delta\bar{\phi})] \quad (39)$$

that is, $$r_z(t)\approx A_o W_o D_o A_i D_i \quad (40)$$

which has become phase-independent. From the decision variable $r_z(t)$, the transmitted data symbol $D_i$ can be obtained.

Those skilled in the art will recognize that the arrows in FIGS. 3A–3B are employed to indicate signals coming into and exiting various circuit elements. Hence, arrows approaching an element, summing operator 265 by way of example, denote its inputs ends; and an arrow exiting summing operator 265 denotes its output end. Such is also the case for all other elements in FIGS. 3A–3B.

As such, the downlink demodulator of the present invention, as exemplified in FIGS. 3A–3B, works by first constructing in-phase and quadrature-phase signals from the received pilot and traffic signals, such that the in-phase and quadrature-phase signals are respectively proportional to cosine and sine functions of the phase mismatch between the pilot and traffic signals. The demodulator further allows the phase mismatch itself to be extracted and averaged. Moreover, the demodulator uses the thus-constructed in-phase and quadrature-phase signals to produce an output signal (decision variable) that is independent of the phase mismatch (and hence the carrier phase in general).

Furthermore, a variety of additional and/or alternative operations can be performed on the averaged phase mismatch $\Delta\bar{\phi}$ provided by the downlink demodulator of the present invention, and the corresponding cosine and sine functions of $\Delta\bar{\phi}$ may be further utilized, as desired by practical applications.

It should be pointed that the embodiment of FIGS. 3A–3B can be also used for demodulation of the downlink channels that employ QPSK and 8PSK modulations. In such cases, factors of 4 and 8 should be fed to multiplier 332 respectively, and factors of ¼ and ⅛ should be accordingly fed to multiplier 338 respectively in FIG. 3B.

Moreover, the embodiment of FIGS. 3A–3B can be used for downlink demodulation in a prior art IS-95 system where the pilot signal and traffic signals are transmitted through a common sector beam. Given that the downlink demodulator of the present invention is capable of completely eliminating the effects of any phase mismatch between the common pilot signal and traffic signals (and hence the carrier phase altogether), it provides a more accurate way of demodulating and extracting the transmitted data.

Those skilled in the art will recognize that FIGS. 3A–3B provide only an exemplary embodiment of a downlink demodulator for purposes of illustrating the principle and utility of the present invention. A variety of downlink demodulators employing different phase-recovery mechanisms can be devised in accordance with the principle of the present invention for various applications. This is particularly acute in light of that IS-95 provides CDMA network manufacturers with no provisions for actual implementation in terms of methods and hardware approaches—so long as they all must produce the waveforms and data sequences specified in IS-95. Thus, a skilled artisan can design a downlink demodulator with an appropriate phase-recovery mechanism in accordance with the present invention to best suit a particular CDMA network. Moreover, the general principle of the phase-recovery method of the present invention can be extended for recovering the phase mismatch between any two cellular signals.

By implementing the phase-recovery process at individual mobile stations, the present invention enables the base station to transmit the traffic signals with optimal power gain and minimal interference.

Although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. A method of cellular communication, comprising:
   a) transmitting a first cellular signal in a first beam, whereby said first cellular signal arrives at a receiver with a first phase;
   b) transmitting a second cellular signal in a second beam, whereby said second cellular signal arrives at said receiver with a second phase;
   c) recovering a phase mismatch between said first and second phases at said receiver; and
   d) utilizing said phase mismatch to demodulate at least one of said first and second cellular signals.

2. The method of claim 1 wherein said first cellular signal comprises a CDMA (IS-95) pilot signal.

3. The method of claim 2 wherein said pilot signal is transmitted through a sector beam.

4. The method of claim 1 wherein said second cellular signal comprises a CDMA (IS-95) traffic signal.

5. The method of claim 4 wherein said traffic signal is transmitted through an adaptive spatial beam.

6. The method of claim 1 wherein said step c) further comprises:
   i) constructing an in-phase signal from said first and second cellular signals, such that said in-phase signal is proportional to a cosine function of said phase mismatch;
   ii) constructing a quadrature-phase signal from said first and second cellular signals, such that said quadrature-phase signal is proportional to a sine function of said phase mismatch; and
   iii) using said in-phase and quadrature-phase signals to derive said phase mismatch.

7. The method of claim 6 further comprising the step of averaging said phase mismatch, thereby obtaining an averaged phase mismatch.

8. The method of claim 7 wherein said step d) comprises:
   i) obtaining a cosine function of said averaged phase mismatch;
   ii) obtaining a sine function of averaged phase mismatch;
   iii) multiplying said in-phase signal by said cosine function of said averaged phase mismatch to yield a first product, and said quadrature-phase signal by said sine function of said averaged phase mismatch to yield a second product; and
   iv) summing said first and second products, thereby producing an output signal that is independent of said phase mismatch.

9. The method of claim 1 wherein said receiver comprises a mobile station.

10. The method of claim 1 wherein each of said first and second cellular signals comprises an element selected from the group consisting of CDMA, FDMA, TDMA, and GSM signals.

11. The method of claim 1 wherein said first and second cellular signals are transmitted by a base station equipped with an adaptive antenna array.

12. A cellular communication system employing a demodulation device, comprising:
   a) a means for constructing an in-phase signal from received first and second cellular signals, such that said in-phase signal is proportional to a cosine function of a phase mismatch between said first and second cellular signals;
   b) a means for constructing a quadrature-phase signal from said first and second cellular signals, such that said quadrature-phase signal is proportional to a sine function of said phase mismatch;
   c) a means for recovering said phase mismatch by way of said in-phase and quadrature-phase signals; and
   d) a means for producing an output signal from said in-phase and quadrature-phase signals, whereby said output signal is independent of said phase mismatch.

13. The cellular communication system of claim 12 wherein said means for constructing an in-phase signal comprises:
   i) a first branch comprising:
      (a) a first multiplier having first and second input ends, and an output end, wherein said first and second cellular signals are fed to said first input end of said first multiplier;
      (b) a first low-pass filter having input and output ends, wherein said input end of said first low-pass filter is connected to said output end of said first multiplier;
      (c) a second multiplier having input and output ends, wherein said input end of said second multiplier is connected to said output end of said first low-pass filter;
      (d) a first summing-operator having input and output ends, wherein said input end of said first summing-operator is connected to said output end of said second multiplier;
      (b) a third multiplier having first and second input ends, and an output end, wherein said first input end of said third multiplier is connected to said output end of said first summing-operator; and
      (f) a second low-pass filter having an input end, and first and second output ends, wherein said input end of said second low-pass filter is connected to said output end of said first summing-operator, and said first output end of said second low-pass filter is connected to said second input end of said third multiplier;
   ii) a second branch comprising:
      (a) a fourth multiplier having first and second input ends, and an output end, wherein said first and second cellular signals are fed to said first input end of said fourth multiplier;
      (b) a third low-pass filter having input and output ends, wherein said input end of said third low-pass filter is connected to said output end of said fourth multiplier;
      (c) a fifth multiplier having first and second input ends, and an output end, wherein said first input end of said fifth multiplier is connected to said output end of said third low-pass filter;
      (d) a second summing-operator having input and output ends, wherein said input end of said second summing-operator is connected to said output end of said fifth multiplier;
      (e) a sixth multiplier having first and second input ends, and an output end, wherein said first input end of said sixth multiplier is connected to said output end of said second summing-operator; and
      (f) a fourth low-pass filter having an input end, and first and second output ends, wherein said input end of said fourth low-pass filter is connected to said output end of said second summing-operator, and said first output end of said fourth low-pass filter is connected to said second input end of said sixth multiplier;
   iii) a seventh multiplier having first and second input end, and an output end, wherein said first input end of said seventh multiplier is connected to said output end of said first low-pass filter, and said output end of said seventh multiplier is connected to said input end of said second summing-operator;
   iv) a eighth multiplier having first and second input ends, and an output end, wherein said first input end of said eighth multiplier is connected to said output end of said third low-pass filter, and said output end of said eighth multiplier is connected to said input end of said first summing-operator;
   v) a third summing-operator having first and second input ends, and an output end, wherein said first and second input ends of said third summing-operator are connected to said output ends of said third multiplier and said sixth multiplier respectively; and
   vi) a first Walsh-decomposition assembly having input and output ends, wherein said input end of said first Walsh-decomposition assembly is connected to said output end of said third summing-operator.

14. The cellular communication system of claim 13 wherein an in-phase demodulation function is fed to said second input end of said first multiplier.

15. The cellular communication system of claim 13 wherein a quadrature-phase demodulation function is fed to said second input end of said fourth multiplier.

16. The cellular communication system of claim 13 wherein an I-channel short pseudo-random noise (PN) sequence is fed to said second input end of said second multiplier.

17. The cellular communication system of claim 13 wherein a negative I-channel PN sequence is fed to said second input end of said fifth multiplier.

18. The cellular communication system of claim 13 wherein a Q-channel PN sequence is fed to said second input end of said seventh multiplier.

19. The cellular communication system of claim 13 wherein a Q-channel PN sequence is fed to said second input end of said eighth multiplier.

20. The cellular communication system of claim 13 wherein said first Walsh-decomposition assembly comprises a first Walsh-function multiplier and a first integrator.

21. The cellular communication system of claim 13 wherein said first and third low-pass filters are substantially identical in operation.

22. The cellular communication system of claim 13 wherein said second and fourth low-pass filters are substantially identical in operation.

23. The cellular communication system of claim 13 wherein said means for constructing a quadrature-phase signal comprises:
   i) a ninth multiplier having first, second and third input ends, and an output end, wherein said first input end of said ninth multiplier is connected to said output end of said first summing-operator, said second input end of said ninth multiplier is connected to said second output end of said fourth low-pass filter, and said output end of said ninth multiplier is connected to a first input end of a fourth summing-operator;

ii) a tenth multiplier having first and second input ends, and an output end, wherein said first input end of said tenth multiplier is connected to said output end of said second summing-operator, said second input end of said tenth multiplier is connected to said second output end of said second low-pass filter, and said output end of said tenth multiplier is connected to a second input end of said fourth summing-operator; and iii) a second Walsh-decomposition assembly having input and output ends, wherein said input end of said second Walsh-decomposition assembly is connected to an output end of said fourth summing-operator.

24. The cellular communication system of claim 23 wherein a factor of (−1) is fed to said third input end of said ninth multiplier.

25. The cellular communication system of claim 23 wherein said second Walsh-decomposition assembly comprises a second Walsh-function multiplier and a second integrator.

26. The cellular communication system of claim 23 wherein said means for recovering said phase mismatch comprises:

i) a first arctan-operator having first and second input ends, and an output end, wherein said first and second input ends of said first arctan-operator are connected to said output ends of said first and second Walsh-decomposition assemblies respectively;

ii) an eleventh multiplier having first and second input ends, and an output end, wherein said first input end of said eleventh multiplier is connected to said output end of said arctan-operator;

iii) first cosine-operator and first sine-operator, each having input and output ends, wherein said input ends of said first cosine-operator and first sine-operator are connected to said output end of said eleventh multiplier;

iv) fifth and sixth low-pass filters, each having input and output ends, wherein said input ends of said fifth and sixth low-pass filters are connected to said output ends of said first cosine-operator and first sine-operator respectively;

v) a second arctan-operator having first and second input ends, and an output end, wherein said first and second input ends of said second arctan-operator are connected to said output ends of said fifth and sixth low-pass filters respectively;

vi) a twelfth multiplier having first and second input ends, and an output end, wherein said first input end of said twelfth multiplier is connected to said output end of said second arctan-operator; and vii) second cosine-operator and second sine-operator, each having input and output ends, wherein said input ends of said second cosine-operator and sine-operator are connected to said output end of said twelfth multiplier.

27. The cellular communication system of claim 26 wherein a factor of 2 is fed to said second input end of said eleventh multiplier.

28. The cellular communication system of claim 27 wherein a factor of ½ is fed to said second input end of said twelfth multiplier multiplier.

29. The cellular communication system of claim 26 wherein a factor of 4 is fed to said second input end of said eleventh multiplier.

30. The cellular communication system of claim 29 wherein a factor of ¼ is fed to said second input end of said twelfth multiplier multiplier.

31. The cellular communication system of claim 26 wherein a factor of 8 is fed to said second input end of said eleventh multiplier.

32. The cellular communication system of claim 31 wherein a factor of ⅛ is fed to said second input end of said twelfth multiplier multiplier.

33. The cellular communication system of claim 26 wherein said fifth and sixth low-pass filters are substantially identical in operation.

34. The cellular communication system of claim 26 wherein said means for producing an output signal comprises:

i) a thirteenth multiplier have first and second input ends, and an output end, wherein said first input end of said thirteenth multiplier are connected to said output end of said first Walsh-decomposition assembly, and said second input end of said thirteenth multiplier is connected to said output end of said second cosine-operator;

ii) a fourteenth multiplier have first and second input ends, and an output end, wherein said first input end of said fourteenth multiplier is connected to said output end of said second Walsh-decomposition assembly, and said second input end of said fourteenth multiplier is connected to said output end of said second sine-operator; and iii) a fifth summer-operator having first and second input ends, and an output end, wherein said first and second input ends of said fifth summer-operator are connected to said output ends of said thirteenth and fourteenth multipliers respectively.

35. The cellular communication system of claim 12 further comprising one or more mobile stations, wherein each of said one or more mobile stations comprises said demodulation device.

36. The cellular communication system of claim 12 further comprising a base station equipped with an adaptive antenna array, whereby said base station transmits said first and second cellular signals.

37. The cellular communication system of claim 36 wherein said first cellular signal comprises a CDMA (IS-95) pilot signal, and wherein said pilot signal is transmitted through a sector beam.

38. The cellular communication system of claim 36 wherein said second cellular signal comprises a CDMA (IS-95) traffic signal, and wherein said traffic signal is transmitted through an adaptive spatial beam.

* * * * *